United States Patent
Stahlberg et al.

(10) Patent No.: US 11,741,240 B2
(45) Date of Patent: Aug. 29, 2023

(54) TOKENIZED HARDWARE SECURITY MODULES

(71) Applicant: Google LLC, Mountain View, CA (US)

(72) Inventors: Patrick Stahlberg, Arlington, VA (US); August Huber, New York, NY (US); Il-Sung Lee, New York, NY (US); Tao Tao, Jericho, NY (US); Xiaolan Zhang, Chappaqua, NY (US); John Randolph, Brooklyn, NY (US); David Elrom, Mountain View, CA (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 17/339,904

(22) Filed: Jun. 4, 2021

(65) Prior Publication Data

US 2021/0297260 A1    Sep. 23, 2021

Related U.S. Application Data

(63) Continuation of application No. 15/879,731, filed on Jan. 25, 2018, now Pat. No. 11,032,080.

(60) Provisional application No. 62/522,460, filed on Jun. 20, 2017.

(51) Int. Cl.
| | |
|---|---|
| *G06F 21/60* | (2013.01) |
| *H04L 9/40* | (2022.01) |
| *G06F 21/72* | (2013.01) |
| *H04L 9/32* | (2006.01) |
| *H04L 9/08* | (2006.01) |

(52) U.S. Cl.
CPC .......... *G06F 21/602* (2013.01); *G06F 21/72* (2013.01); *H04L 9/3234* (2013.01); *H04L 9/3247* (2013.01); *H04L 9/3271* (2013.01); *H04L 63/0853* (2013.01); *H04L 63/101* (2013.01); *H04L 63/108* (2013.01); *H04L 9/0825* (2013.01)

(58) Field of Classification Search
None
See application file for complete search history.

(56) References Cited

U.S. PATENT DOCUMENTS

| | | |
|---|---|---|
| 7,640,582 B2 | 12/2009 | Beck |
| 7,885,413 B2 | 2/2011 | Vasic et al. |
| 8,631,247 B2 | 1/2014 | O'Loughlin et al. |
| 8,667,269 B2 | 3/2014 | Schibuk |
| 8,689,287 B2 | 4/2014 | Bohmer et al. |
| 8,880,466 B2 | 11/2014 | Prahlad et al. |
| 9,405,928 B2 | 8/2016 | Amarendran et al. |

(Continued)

*Primary Examiner* — Benjamin E Lanier

(74) *Attorney, Agent, or Firm* — Honigman LLP; Brett A. Krueger

(57) ABSTRACT

A method for processing a cryptographic operation request includes receiving, at a hardware security module (HSM), the cryptographic operation request including a cryptographic key and at least one authorization token, determining, by the HSM, whether an access control list (ACL) associated with the cryptographic key of the cryptographic operation request is authorized to govern access to the cryptographic key, and validating, by the HSM, the at least one authorization token. When the at least one authorization token is valid and the ACL is authorized to govern access to the cryptographic key of the cryptographic operation request, the method includes processing, by the HSM, the cryptographic operation request.

18 Claims, 9 Drawing Sheets

(56) References Cited

U.S. PATENT DOCUMENTS

| | | |
|---|---|---|
| 9,420,007 B1 | 8/2016 | Roth et al. |
| 9,519,696 B1 | 12/2016 | Roth et al. |
| 9,866,392 B1 | 1/2018 | Campagna et al. |
| 10,693,638 B1 * | 6/2020 | Cignetti ................ G06F 21/602 |
| 2009/0031131 A1 | 1/2009 | Qiu et al. |
| 2012/0131354 A1 | 5/2012 | French |
| 2015/0220917 A1 | 8/2015 | Aabye et al. |
| 2015/0312038 A1 | 10/2015 | Palanisamy |
| 2016/0094546 A1 | 3/2016 | Innes et al. |
| 2016/0182470 A1 | 6/2016 | Rubin et al. |
| 2017/0006018 A1 | 1/2017 | Campagna et al. |
| 2017/0223005 A1 | 8/2017 | Birgisson et al. |
| 2018/0205711 A1 | 7/2018 | Kumar et al. |
| 2019/0052456 A1 | 2/2019 | Bygrave et al. |

\* cited by examiner

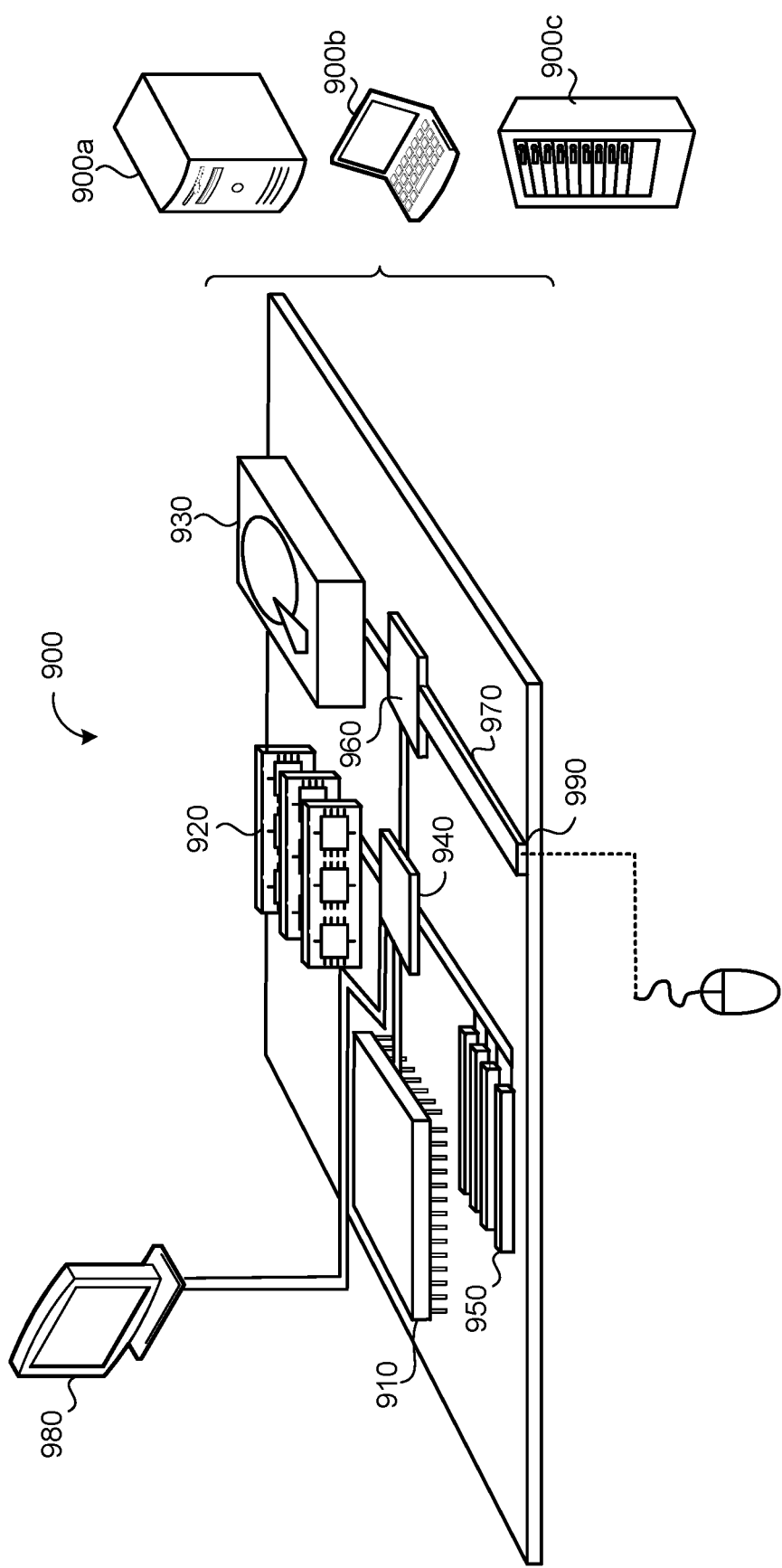

TOKENIZED HARDWARE SECURITY MODULES

CROSS REFERENCE TO RELATED APPLICATIONS

This U.S. patent application is a continuation of, and claims priority under 35 U.S.C. § 120 from, U.S. patent application Ser. No. 15/879,731, filed on Jan. 25, 2018, which claims priority under 35 U.S.C. § 119(e) to U.S. Provisional Application No. 62/522,460, filed on Jun. 20, 2017. The disclosure of these prior applications are considered part of the disclosure of this application and are hereby incorporated by reference in their entireties.

TECHNICAL FIELD

This disclosure relates to hardware security modules.

BACKGROUND

Data can be encrypted for secure storage on a computer readable/writable medium and then decrypted when accessed for usage. For relatively fast usage, the actual encryption and decryption may execute through a cryptographic computer program residing on a general purpose computer. The cryptographic computer program must access one or more cryptographic keys to encrypt and decrypt the data. Storage of the cryptographic keys in a file on a file system or in memory of the general purpose computer can be relatively insecure. Instead, a Hardware Security Module (HSM), which may be a hardware device inside or connected to the general purpose computer, may generate and/or store the cryptographic keys. The hardware security module may operate at the same speed as the computer and protect its contents, never revealing the content in an unencrypted form to the host computer. Moreover, the host computer cannot access and address any of the storage memory of the hardware security module.

SUMMARY

One aspect of the disclosure provides a method for processing a cryptographic operation request. The method includes receiving, at a hardware security module (HSM), the cryptographic operation request including a cryptographic key and at least one authorization token, determining, by the HSM, whether an access control list (ACL) associated with the cryptographic key of the cryptographic operation request is authorized to govern access to the cryptographic key, and validating, by the HSM, the at least one authorization token. When the at least one authorization token is valid and the ACL is authorized to govern access to the cryptographic key of the cryptographic operation request, the method includes processing, by the HSM, the cryptographic operation request.

Implementations of the disclosure may include one or more of the following optional features. In some implementations, the at least one authorization token is valid when at least one of: the at least one authorization token is signed by an authorizer key; the HSM has received the at least one authorization token within an authorization time period defined by the at least one authorization token; or the HSM has received the at least one authorization token less times than a limit number defined by the at least one authorization token. When the cryptographic key of the cryptographic operation request matches the corresponding cryptographic key of the ACL, the method may include determining, by the HSM, whether a cryptographic operation requested by the cryptographic operation request is allowed by the ACL. When the cryptographic operation requested by the cryptographic operation request is allowed by the ACL, the method may include processing the cryptographic operation request.

In some examples, the method includes receiving, at the HSM, a challenge request from an owner of the cryptographic key and issuing, from the HSM, a corresponding authorization token to the owner of the cryptographic key. The corresponding authorization token may include data identifying the HSM and a cryptographic signature of the HSM. The corresponding authorization token may also define at least one of an authorization time period or a limit number limiting a number of usages of the corresponding authorization token. The cryptographic key of the cryptographic operation request may be wrapped.

Another aspect of the disclosure provides a HSM including data processing hardware and memory hardware in communication with the data processing hardware. The memory hardware stores instructions that when executed on the data processing hardware cause the data processing hardware to perform operations. The operations include receiving a cryptographic operation request including a cryptographic key and at least one authorization token, determining whether an access control list (ACL) associated with the cryptographic key of the cryptographic operation request is authorized to govern access to the cryptographic key, and validating the at least one authorization token. When the at least one authorization token is valid and the ACL is authorized to govern access to the cryptographic key of the cryptographic operation request, the operations include processing the cryptographic operation request.

This aspect may include one or more of the following optional features. In some implementations, the at least one authorization token is valid when at least one of: the at least one authorization token is signed by an authorizer key; the data processing hardware has received the at least one authorization token within an authorization time period defined by the at least one authorization token; or the data processing hardware has received the at least one authorization token less times than a limit number defined by the at least one authorization token. When the cryptographic key of the cryptographic operation request matches the corresponding cryptographic key of the ACL, the operations may include determining whether a cryptographic operation requested by the cryptographic operation request is allowed by the ACL. When the cryptographic operation requested by the cryptographic operation request is allowed by the ACL, the operations may include processing the cryptographic operation request. The operations may further include receiving a challenge request from an owner of the cryptographic key and issuing a corresponding authorization token to the owner of the cryptographic key.

In some examples, the corresponding authorization token includes data identifying the HSM and a cryptographic signature of the HSM. The corresponding authorization token may define at least one of an authorization time period or a limit number limiting a number of usages of the corresponding authorization token. The cryptographic key of the cryptographic operation request may be wrapped.

Yet another aspect of the disclosure provides a second method for processing a cryptographic operation request. The method includes receiving, at a distributed system, a cryptographic operation request from a user. The cryptographic operation request includes a cryptographic key and at least one authorization token. The method also includes sending, by the distributed system, the operation request to a HSM configured to perform operations. The operations include determining whether an access control list (ACL) associated with the cryptographic key of the cryptographic operation request is authorized to govern access to the cryptographic key and validating the at least one authorization token. When the at least one authorization token is valid and the ACL is authorized to govern access to the cryptographic key of the cryptographic operation request, the operations include processing the cryptographic operation request. The method further includes receiving, at the distributed system, a response from the HSM, and when the HSM processes the cryptographic operation request, the response includes a result of the cryptographic operation. The method also includes sending the response from the distributed system to the user.

This aspect may include one or more of the following optional features. In some implementations, the at least one authorization token is valid when at least one of: the at least one authorization token is signed by an authorizer key; the HSM has received the at least one authorization token within an authorization time period defined by the at least one authorization token; or the HSM has received the at least one authorization token less times than a limit number defined by the at least one authorization token. When the cryptographic key of the cryptographic operation request matches the corresponding cryptographic key of the ACL, the operations may include determining whether a cryptographic operation requested by the cryptographic operation request is allowed by the ACL. When the cryptographic operation requested by the cryptographic operation request is allowed by the ACL, the operations may include processing the cryptographic operation request.

In some examples, the method includes receiving, at the distributed system, a challenge request from an owner of the cryptographic key and sending the challenge request to the HSM, the HSM configured to issue a corresponding authorization token to the owner of the cryptographic key. The corresponding authorization token may include data identifying the HSM and a cryptographic signature of the HSM. The corresponding authorization token may also define at least one of an authorization time period or a limit number limiting a number of usages of the corresponding authorization token. The cryptographic key of the cryptographic operation request may be wrapped.

Yet another aspect of the disclosure provides a system including data processing hardware and memory hardware in communication with the data processing hardware. The memory hardware stores instructions that when executed on the data processing hardware cause the data processing hardware to perform operations. The operations include receiving a cryptographic operation request from a user, the cryptographic operation request including a cryptographic key and at least one authorization token and sending the operation request to a HSM configured to perform operations. The operations include determining whether an access control list (ACL) associated with the cryptographic key of the cryptographic operation request is authorized to govern access to the cryptographic key and validating the at least one authorization token. When the at least one authorization token is valid and the ACL is authorized to govern access to the cryptographic key of the cryptographic operation request, the operations include processing the cryptographic operation request. The operations further include receiving a response from the HSM, and when the HSM processes the cryptographic operation request, the response includes a result of the cryptographic operation and sending the response from the distributed system to the user.

This aspect may include one or more of the following optional features. In some implementations, the at least one authorization token is valid when the at least one authorization token is signed by an authorizer key. The at least one authorization token may be valid when the HSM has received the at least one authorization token within an authorization time period defined by the at least one authorization token. The at least one authorization token may also be valid when the HSM has received the at least one authorization token less times than a limit number defined by the at least one authorization token.

In some examples, when the cryptographic key of the cryptographic operation request matches the corresponding cryptographic key of the ACL, the operations include determining whether a cryptographic operation requested by the cryptographic operation request is allowed by the ACL. When the cryptographic operation requested by the cryptographic operation request is allowed by the ACL, the operations may include processing the cryptographic operation request. The operations may further include receiving a challenge request from an owner of the cryptographic key and sending the challenge request to the HSM. The HSM may be configured to issue a corresponding authorization token to the owner of the cryptographic key. The corresponding authorization token may include data identifying the HSM and a cryptographic signature of the HSM. The corresponding authorization token may define at least one of an authorization time period or a limit number limiting a number of usages of the corresponding authorization token. The cryptographic key of the cryptographic operation request may be wrapped.

Yet another aspect of the disclosure provides a third method for processing a cryptographic operation request. The method includes receiving, at a distributed system, a cryptographic operation request from a user. The cryptographic operation request includes a cryptographic key. The method also includes obtaining, by the distributed system, at least one authorization token, and sending, by the distributed system, the operation request and the least one authorization token to a HSM configured to perform operations. The operations include determining whether an access control list (ACL) associated with the cryptographic key of the cryptographic operation request is authorized to govern access to the cryptographic key and validating the at least one authorization token. When the at least one authorization token is valid and the ACL is authorized to govern access to the cryptographic key of the cryptographic operation request, the operations include processing the cryptographic operation request. The method also includes receiving, at the distributed system, a response from the HSM, and when the HSM processes the cryptographic operation request, the response comprises a result of the cryptographic operation and sending the response from the distributed system to the user.

Implementations of the disclosure may include one or more of the following optional features. In some implementations, the at least one authorization token is valid when at least one of: the at least one authorization token is signed by an authorizer key; the HSM has received the at least one authorization token within an authorization time period defined by the at least one authorization token; or the HSM has received the at least one authorization token less times than a limit number defined by the at least one authorization token. When the cryptographic key of the cryptographic operation request matches the corresponding cryptographic key of the ACL, the operations may include determining whether a cryptographic operation requested by the cryptographic operation request is allowed by the ACL. When the cryptographic operation requested by the cryptographic operation request is allowed by the ACL, the operations may also include processing the cryptographic operation request.

In some examples, the method includes receiving, at the distributed system, a challenge request from an owner of the cryptographic key and sending the challenge request to the HSM, the HSM configured to issue a corresponding authorization token to the owner of the cryptographic key. The corresponding authorization token may include data identifying the HSM and a cryptographic signature of the HSM. The corresponding authorization token may also define at least one of an authorization time period or a limit number limiting a number of usages of the corresponding authorization token. The cryptographic key of the cryptographic operation request may be wrapped.

Yet another aspect of the disclosure provides a system including data processing hardware and memory hardware in communication with the data processing hardware. The memory hardware stores instructions that when executed on the data processing hardware cause the data processing hardware to perform operations. The operations include receiving a cryptographic operation request from a user, the cryptographic operation request including a cryptographic key, obtaining at least one authorization token, and sending the operation request and the least one authorization token to a HSM configured to perform operations. The operations include determining whether an access control list (ACL) associated with the cryptographic key of the cryptographic operation request is authorized to govern access to the cryptographic key and validating the at least one authorization token. When the at least one authorization token is valid and the ACL is authorized to govern access to the cryptographic key of the cryptographic operation request, the operations include processing the cryptographic operation request. The operations also include receiving a response from the HSM, and when the HSM processes the cryptographic operation request, the response comprises a result of the cryptographic operation, and sending the response to the user.

This aspect may include one or more of the following optional features. In some implementations, the at least one authorization token is valid when the at least one authorization token is signed by an authorizer key. The at least one authorization token may be valid when the cryptographic operation request is received by the HSM within an authorization time period defined by the at least one authorization token. The at least one authorization token may also be valid when the HSM has received the cryptographic operation request less times than a limit number defined by the at least one authorization token.

In some examples, when the cryptographic key of the cryptographic operation request matches the corresponding cryptographic key of the ACL, the operations include determining whether a cryptographic operation requested by the cryptographic operation request is allowed by the ACL. When the cryptographic operation requested by the cryptographic operation request is allowed by the ACL, the operations may include processing the cryptographic operation request. The operations may also include receiving a challenge request from an owner of the cryptographic key and sending the challenge request to the HSM, the HSM configured to issue a corresponding authorization token to the owner of the cryptographic key. The corresponding authorization token may include data identifying the HSM and a cryptographic signature of the HSM. The corresponding authorization token may define at least one of an authorization time period or a limit number limiting a number of usages of the corresponding authorization token. The cryptographic key of the cryptographic operation request may be wrapped.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 9 is a schematic view of an example computing device executing hardware security module manager of FIG. 1.

Like reference symbols in the various drawings indicate like elements.

DETAILED DESCRIPTION

Hardware security modules allow users to encapsulate cryptographic secrets and authorize which users are permitted to perform cryptographic operations on the cryptographic secrets. When hardware security modules are integrated within a cloud environment (e.g., distributed system) and the users store their cryptographic keys in the cloud environment, the provider of the cloud environment unduly has full privileges over all the cryptographic keys stored on the users' behalf, and thus, undermines the purpose of hardware security modules use in controlling and limiting access to cryptographic keys. Implementations herein are directed toward requiring a user requesting a hardware security module integrated within the cloud environment to process a cryptographic operation to provide a wrapped cryptographic key in addition to at least one authorization token generated by the hardware security module and digitally signed by an authorizer key. The hardware security module may verify that the hardware security module generated and signed the authorization token. The hardware security module further validates the authorization token to determine whether the user requesting the cryptographic operation is authorized to access a corresponding cryptographic key associated with an access control list for performing the cryptographic operation.

Figure 1:
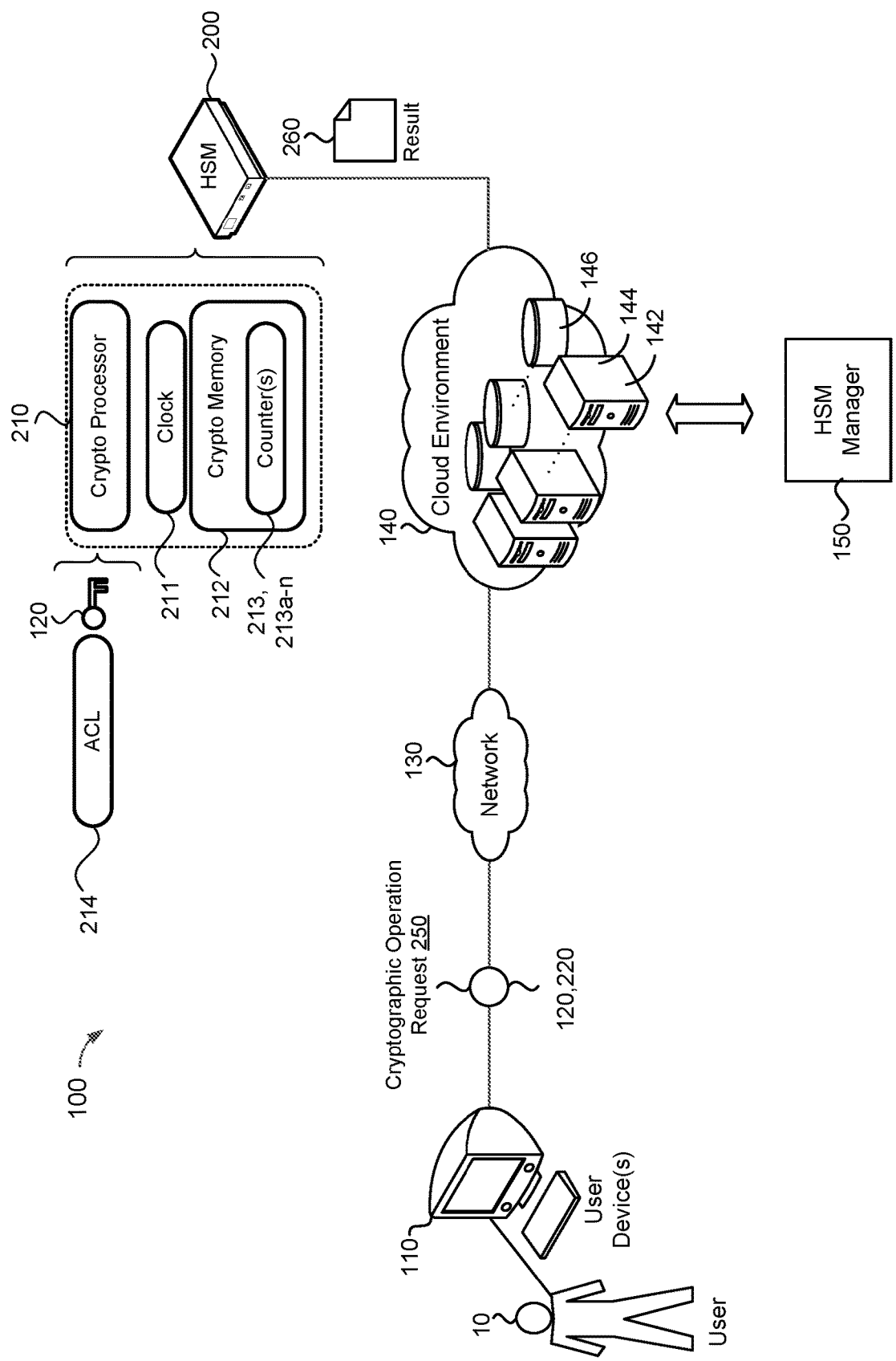
FIG. 1 is a schematic view of an example cryptographic system for processing a cryptographic operation request that includes at least one capability token.
Figure 2:
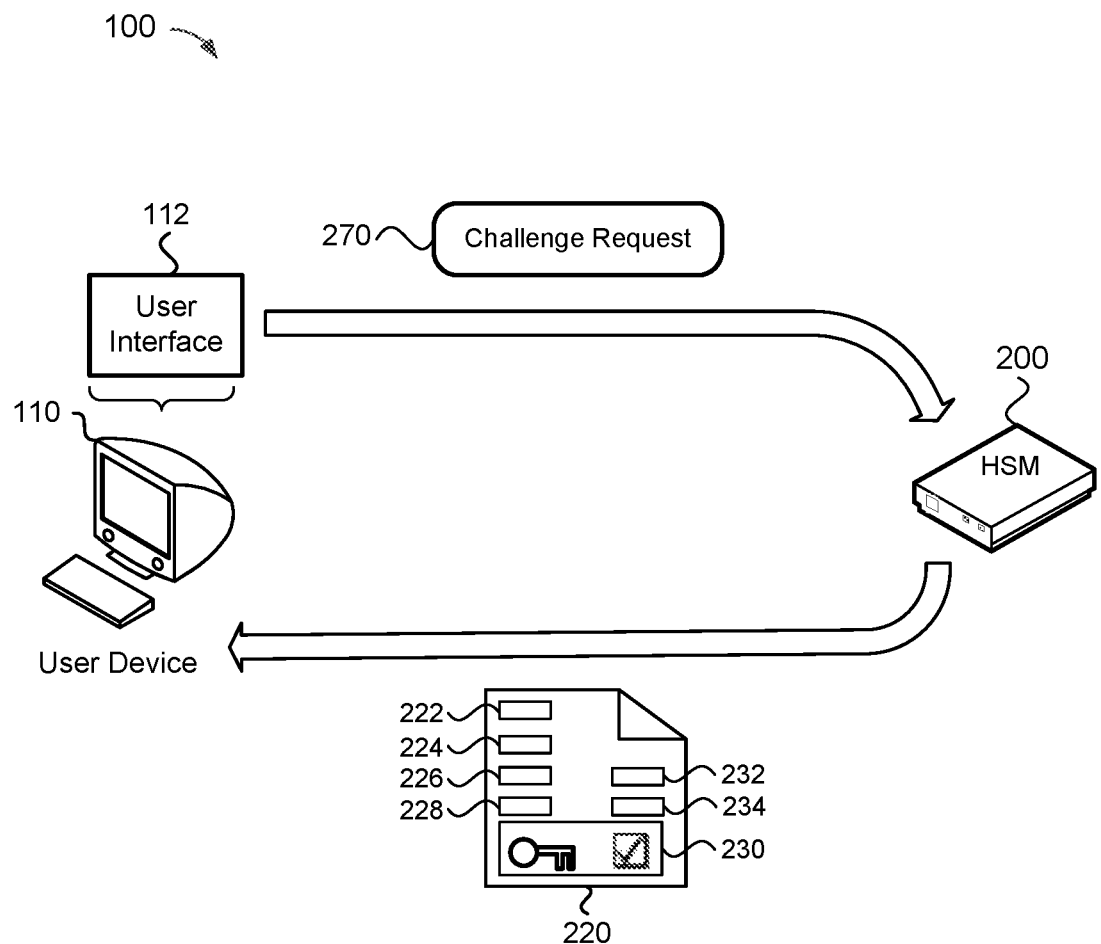
FIG. 2 is a schematic view of an example hardware security module issuing an authorization token in response to receiving a challenge request from an owner of a cryptographic key.

Referring to FIGS. 1 and 2, in some implementations, a cryptographic system 100 includes a user device 110, 110a-n associated with a user 10, who may communicate, via a network 130, with a remote system 140. The remote system 140 may be a distributed system (e.g., cloud environment) having scalable/elastic resources 142. The resources 142 include computing resources 144 and/or storage resources 146. The system 100 further includes a hardware security module (HSM) 200 in communication with the resources 142 of the distributed system 140. Specifically, the HSM 200 is a piece of hardware having associated software/firmware that attaches to circuitry of the resources (i.e., the computing resources 144) to provide one or more cryptographic functions. Other names for a hardware security module include Personal Computer Security Module (PCSM), Secure Application Module (SAM), Hardware Cryptographic Device or Cryptographic Module. In some implementations, the distributed system 140 executes an HSM manager 150 that facilitates communication between one or more user devices 110 and the HSM 200.

In some implementations, the HSM 200 includes a secure crypto processor 210 (i.e., data processing hardware 210) and secure crypto memory 212 (i.e., memory hardware 212) in communication with the crypto processor 210. The crypto processor 210 may provide (a) onboard secure generation; (b) onboard secure storage; (c) use of cryptographic and sensitive data; and/or (d) offloading of application servers for complete asymmetric and symmetric cryptography. In some examples, the HSM 200 handles asymmetric key pairs (and certificates) used in public-key cryptography and/or symmetric keys and other arbitrary data. The HSM 200, via the crypto processor 210, may generate a wrapped cryptographic key 120, and an access control list (ACL) 214 associated with the cryptographic key 120 may contain a list of users having access rights to cryptographic and sensitive data managed by the HSM 200. The ACL 214 associated with the cryptographic key 120 may specify one or more authorization tokens 220 that an authorized user 10 of the cryptographic key 120 must provide in order for the HSM 200 to perform an operation on the cryptographic key 120. The ACL 214 may further specify what cryptographic operations (e.g., sign, encrypt and/or decrypt) the HSM 200 is allowed to process. In some examples, the ACL 214 associated with the cryptographic key 120 is included as an intrinsic property of the cryptographic key 120. In other examples, the ACL 214 associated with the cryptographic key 120 is not an intrinsic property of the cryptographic key 120 and may be provided by the authorization token 220. For instance, the ACL 214 may be encoded in the authorization token 220. In these examples, the user 10 may provide the authorization token 220 to the HSM 200 and the HSM 200 may authorize that the ACL 214 governs access to the cryptographic key 120. The ACL 214 provided by the authorization token 220 may specify what authorization signatures are required by the HSM 200 for using the cryptographic key 120 to process the request 250. The HSM 200 may also include an internal clock 211. The crypto memory 212 stores instructions that when executed by the crypto processor 210 cause the crypto processor 210 to perform cryptographic operations. The cryptographic operations executable by the crypto processor 210 may include, but are not limited to, encryption, decryption, cryptographic key generation, authorization token generation, hashing, signing, and/or verification. The crypto memory 212 may additionally include one or more counters 213, 213a-n each incrementing each time a corresponding authorization token 220 is used to execute by the HSM 200 to execute a cryptographic operation.

Figure 5:
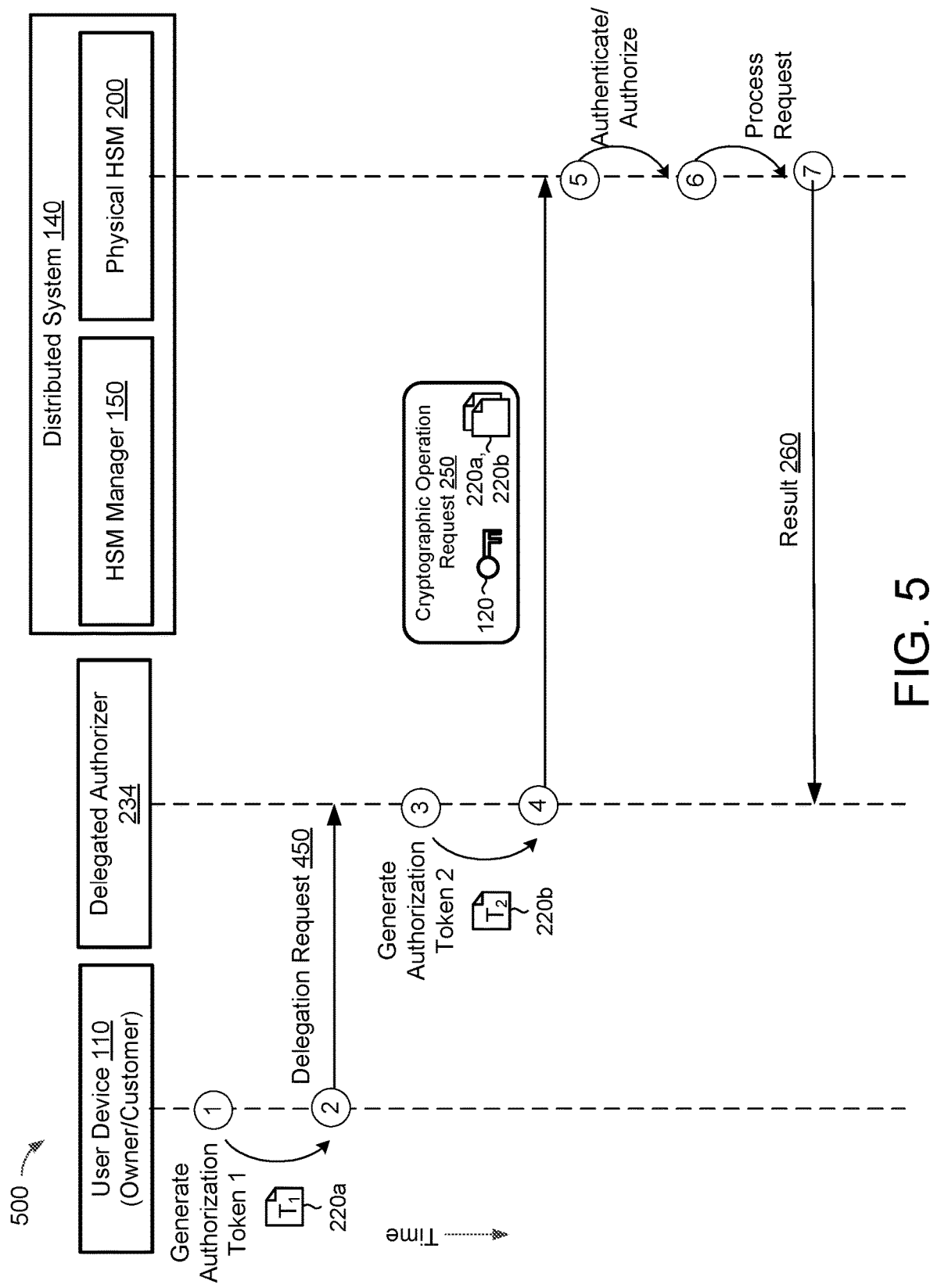
FIG. 5 shows a schematic view of example operations performed by a hardware security module to process a cryptographic operation request from a delegated authorizer delegated by an owner of a cryptographic key.
Figure 6:
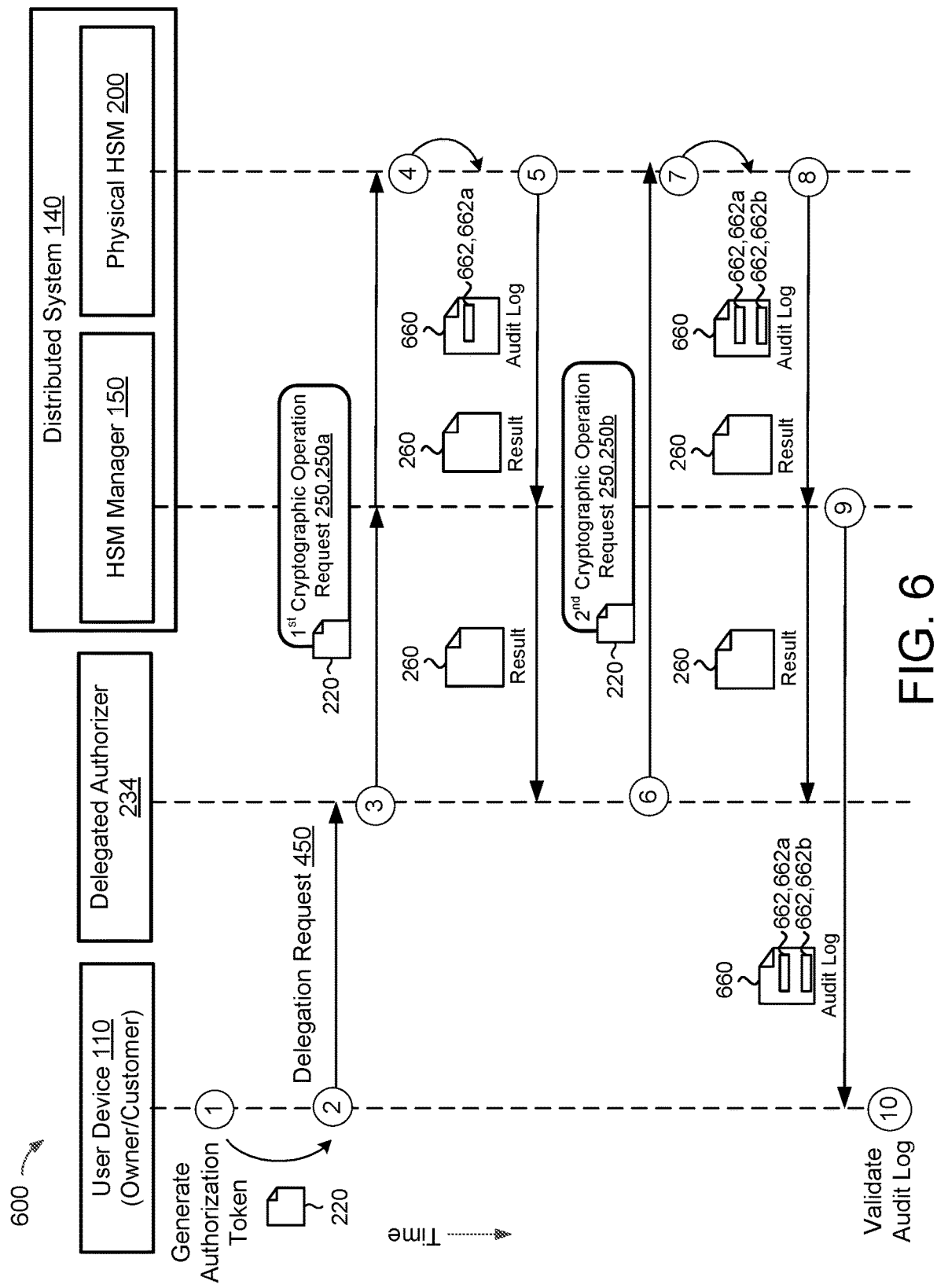
FIG. 6 shows a schematic view of example operations performed by a hardware security module to log an entry in an audit log for cryptographic operations processed by the hardware security module.

The user 10 may be associated with an owner of a wrapped cryptographic key 120 and the user 10 may have full control over how the cryptographic key 120 is used and managed for processing corresponding cryptographic operations on the HSM 200. The wrapped cryptographic key 120 may be encrypted and signed by the HSM 200, and may include secret key material generated by the HSM 200 as well as public parts of an authorizer key(s) 118 (FIG. 3) associated with the user 10 and any delegated authorizers 234 (FIGS. 5 and 6). In some examples, the user 10 corresponds to an individual authorized by the owner of the cryptographic key 120 to access the cryptographic key 120. In some implementations, the owner of the cryptographic key 120 creates/generates an authorization token 220 signed by the authorizer key 118 within the corresponding cryptographic key 120 that the HSM 200 needs to validate before processing a corresponding cryptographic operation request 250 from the user 10. For instance, the HSM 200 may validate the authorization token 220 when the HSM 200 receives the request 250 within an authorization time period defined by the authorization token 220 and/or when the HSM 200 has received the request 250 less times than a limit number defined by the at least one authorization token. As used herein, the authorization token 220 may define a set of "restrictions" that restrict usage of the authorization token 220 for authorizing a cryptographic operation request 250. The authorization token 220 is signed by the authorizer key 118 of the user 10 that is included in the wrapped cryptographic key 120. In some examples, the cryptographic key 120 and the authorization token 220 are created/generated at the same time and bound together. The authorization token 220 may further specify what signatures (e.g., what authorizer keys 118) are required for use of the cryptographic key 120 for processing the cryptographic operation request 250.

In some implementations, the HSM 200 receives a cryptographic operation request 250 including a cryptographic key 120, at least one authorization token 220, and an ACL 214 associated with the cryptographic key 120 or the at least one authorization token 220, and then determines whether the ACL 214 is authorized to govern access to the cryptographic key 120, and validates the at least one authorization token 220. Thus, the ACL 214 associated with the cryptographic key 120 (or the at least one authorization token 220) of the received cryptographic operation request 250 may specify one or more authorization tokens 220 required for validation by the HSM 200 before the HSM 200 will decrypt/unwrap the cryptographic key 120 and process the corresponding cryptographic operation request 250. When the HSM 200 authorizes the ACL 214 governing access to the cryptographic key 120 of the request 250 and validates the at least one authorization token 220, the HSM 200 processes the cryptographic operation request 250 and provides a result 260 of the cryptographic operation back to the user device 110. In some examples, the HSM 200 further determines whether the cryptographic operation requested by the cryptographic operation request 250 is allowed by the ACL 214. In these examples, when the cryptographic operation is allowed by the ACL 214, the HSM 200 processes the cryptographic operation request 250 and provides the corresponding result 260 back to the user device 110. Thus, when the ACL 214 does not allow a cryptographic operation requested by a cryptographic operation request 250, the HSM 200 will not decrypt/unwrap the cryptographic key 120, and therefore will not process the cryptographic operation request 250. The cryptographic operation may include an encryption operation, a decryption operation or a signing operation.

Referring to FIG. 2, in some implementations, the user device 110 associated with the owner 10 of the cryptographic key 120 creates an authorization token 220 by sending a challenge request 270 to the HSM 200 and the HSM 200 issues a corresponding authorization token 220 to the owner 10 of the cryptographic key 120. The user device 110 may execute a user interface 112 to transmit the challenge request 270 to the HSM 200. In some examples, the HSM manager 150 executing on the distributed system 140 receives the challenge request 270 from the user device 110 and sends the challenge request 270 to the HSM 200. In some configurations, the user device 110 may generate the authorization token 220 locally by simply signing the authorization token 220 with an authorizer key 118 within the cryptographic key 120 without exposing the cryptographic key 120 to the HSM 200 over the network 100. In these configurations, the user device 110 may include a local HSM for storing the cryptographic key 120 and locally generating the authorization token 220.

The owner 10 may specify in the challenge request 270 at least one of an authorization time period 226 for validating the authorization token 220, a limit number 228 for limiting a number of usages of the authorization token 220, a cryptographic operation type 232 associated with the authorization token 220, or additional delegated authorizers 234 delegated by the owner 10 to use the authorization token 220. The delegated authorizers 234 may be delegated in the form of one or more additional authorization tokens that these authorizers must provide to the HSM 200 in the cryptographic operation request 250. The delegated authorizers 234 may sign each authorization token 220 using their own authorizer keys 118.

In response to receiving the challenge request 270, the HSM 200 issues the corresponding authorization token 220 to the owner 10 of the cryptographic key 120. In the example shown, the authorization token 220 includes an HSM identifier 222 associated with data identifying the HSM 200 issuing the authorization token 220 and a cryptographic signature 224 of the HSM 200. The authorization token 220 may further include capability restrictions associated with the authorization token 220. For instance, the authorization token 220 may define at least one of the authorization time period 226 for when the corresponding authorization token 220 is valid or the limit number 228 limiting the number of usages of the corresponding authorization token 220. The authorization token 220 may further define the cryptographic operation type 232 for the corresponding authorization token 220 and/or or any delegated authorizers 234 (i.e., delegated users/entities) delegated by the owner 10 of the cryptographic key 120 to further validate the token 220 before sending a request 250 to the HSM 200. A delegated authorizer 234 may refer to an authorization authority such as an entity, individual, or some cloud service (e.g., customer virtual machine) executing on the distributed system 140. In the example shown, the authorization token 220 further includes a digital signature 230 by the authorizer key 118 of the owner 10. When the authorization token 220 defines a delegated authorizer 234, the delegated authorizer 234 is required to sign the authorization token 220 using a corresponding authorizer key 118 associated with the delegated authorizer 234.

Figure 3:
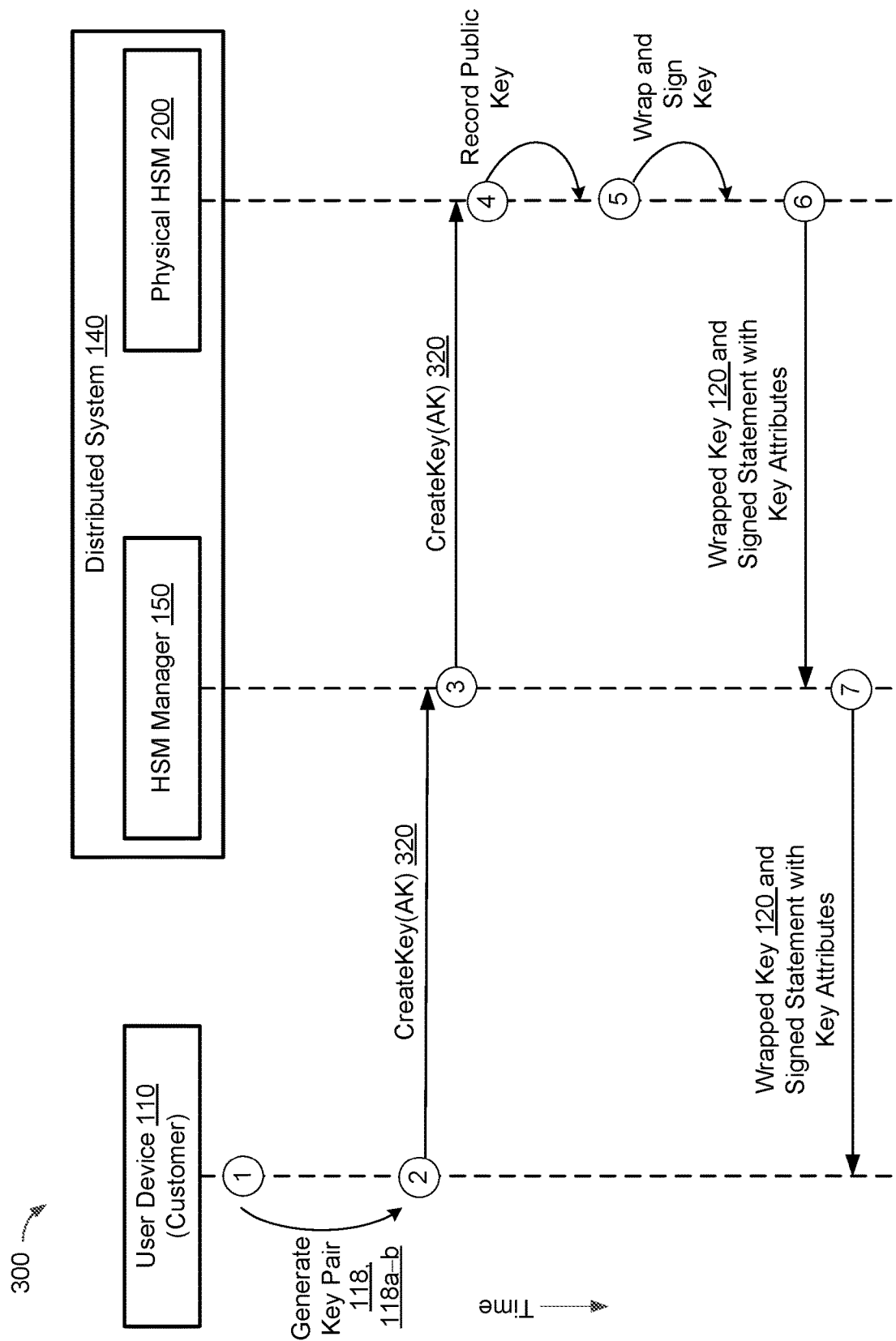
FIG. 3 shows a schematic view of example operations performed by a user device and a hardware security module to create a cryptographic key.

FIG. 3 provides a diagram 300 illustrating example operations performed by the user device 110 and the HSM 200 to create the cryptographic key 120. The user device 110 may be associated with a user 10 corresponding to a customer of a service executing on the distributed system 140. The diagram 300 may be described with reference to the cryptographic system 100 of FIGS. 1 and 2. The vertical y-axis indicates time increasing from the top to the bottom. At time 1, the user device 110 generates a pair of authorizer keys 118, such as asymmetric or symmetric key pairs, for use in performing cryptographic operations at the HSM 200. When the pair of authorizer keys 118 include asymmetric keys, the asymmetric keys 118 may include a private authorizer key 118a (e.g., decryption key or signing key) and a public authorizer key 118b (e.g., encryption key or verification key). Here, the private authorizer key 118a is owned by the customer 10 and kept secret from the HSM 200 on the distributed system 140 and the public authorizer key 118b includes the public parts of the private authorizer key 118a. At time 2, the user device 110 sends a create key operation (CreateKey(AK)) 320 by sending the public authorizer key 118a to the HSM 200 on the distributed system 140. The user interface 112 executing on the user device 110 may allow the user device 110 to generate the pair of authorizer keys 118 and send the CreateKey(AK) 320. For instance, the user interface 112 may allow the customer 10 to access a client library or command line tool, manually generate the pair of authorizer keys 118 and use a call application programming interface (API) to send the public authorizer key 118b to the HSM 200, or simply provide an API that permits the HSM manager 150 or other service executing on the distributed system to generate the authorizer keys 118. Between times 2 and 3, the CreateKey(AK) 320 corresponds to an HSM vendor neutral CreateKey(AK) 320.

At time 3, the HSM manager 150 may receive and send the create key operation 320 including the public authorizer key 118 to the HSM 200. The CreateKey(AK) 320 may correspond to an HSM 200 vendor-specific CreateKey(AK) 320. At time 4, in response to receiving the CreateKey(AK) 320, the HSM 200 records the public authorizer key 118 (i.e., the public parts of the private authorizer key 118), and at time 5, the HSM 200 generates and wraps the cryptographic key 120. Here, the wrapped cryptographic key 120 is encrypted and signed by the HSM 200 and may include the public parts of the authorizer keys 118 and the associated ACL 214. As used herein, the HSM 200 signs the wrapped cryptographic key 120 with a signed statement including attributes of the corresponding public parts of the authorizer key 118. As will become apparent, only the HSM 200 is capable of performing operations on the wrapped cryptographic key 120 when authorized users 10 present the wrapped cryptographic key 120 and the at least one authorization token 220 specified by the ACL 214 associated with the wrapped cryptographic key 120. In some scenarios, the authorization token 220 of the cryptographic operation request 250 provides the ACL 214 to the HSM 200. At time 6, the HSM 200 sends the wrapped cryptographic key 120 to the HSM manager 150, and at time 7, the HSM manager 150 receives and sends the wrapped cryptographic key 120 to the user device 110. Between times 6 and 7, the wrapped cryptographic key 120 may include an HSM vendor-specific format, whereas the wrapped cryptographic key 120 may include a vendor-neutral format when the HSM manager 150 sends the key 120 to the user device 110 at time 7.

Figure 4:
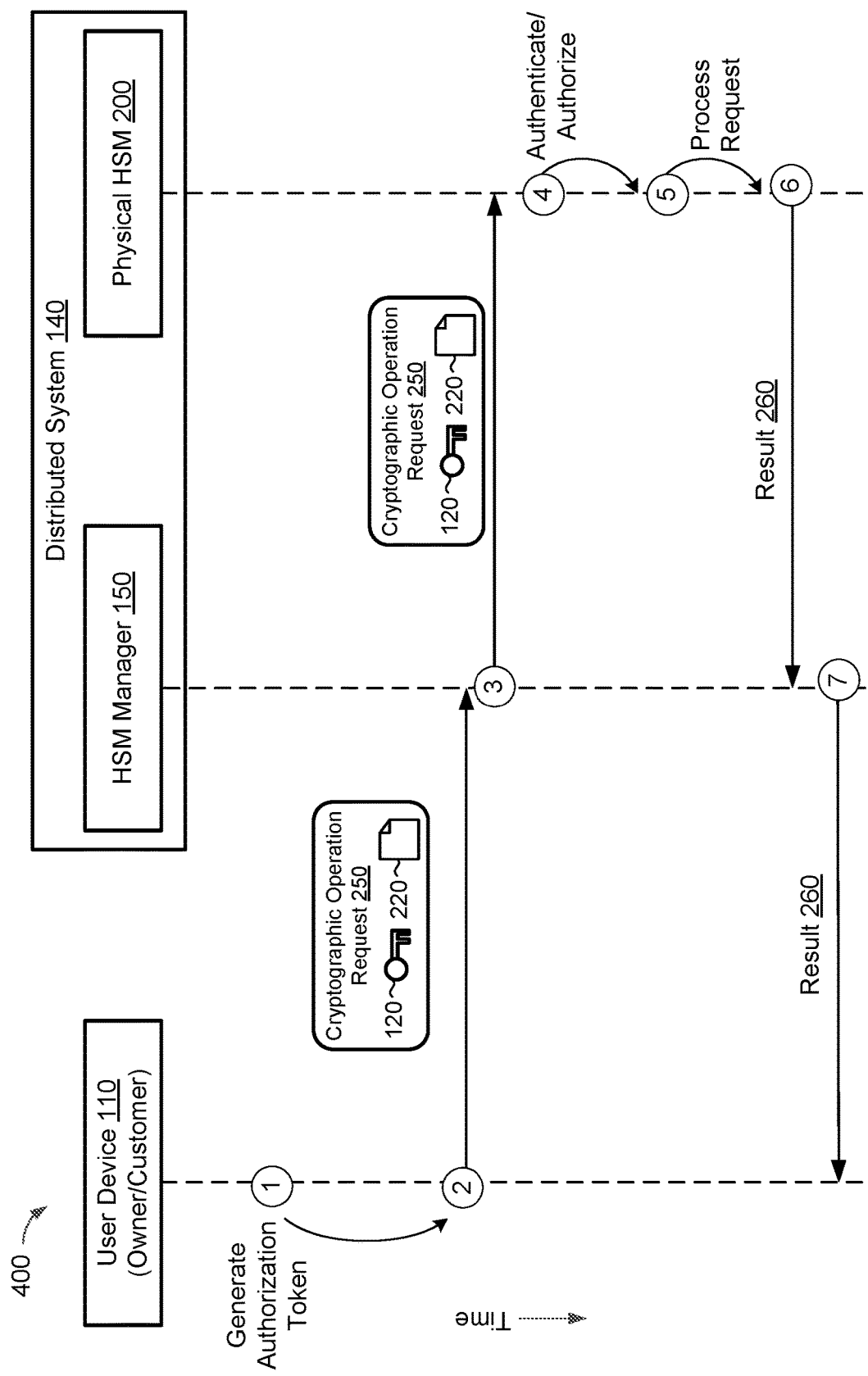
FIG. 4 shows a schematic view of example operations performed by a hardware security module to process a cryptographic operation request from a user.

FIG. 4 provides a diagram 400 illustrating example operations performed by the HSM 200 to process a cryptographic operation request 250 from the user device 110 associated with an owner of the cryptographic key 120. The diagram 400 may be described with reference to the cryptographic system 100 of FIGS. 1 and 2. The vertical y-axis indicates time increasing from the top to the bottom. At time 1, the user device 110 generates an authorization token 220 that authorizes access to the cryptographic key 120 for use in performing a corresponding cryptographic operation at the HSM 200. The user device 110 may generate the authorization token 220 by sending the challenge request 270 to have the HSM 200 issue the corresponding authorization token 220 to the owner 10 of the cryptographic key 120, as described above with reference to FIG. 2. In some implementations, the user device 110 generates the authorization token 220 at the time of creation of the cryptographic key 120.

At time 2, the user device 110 sends the cryptographic operation request 250 including the wrapped cryptographic key 120 and the authorization token 220 to the HSM 200. The wrapped cryptographic key 120 may be generated by the HSM 200 using the authorizer key 118 of the user 10 as described above with reference to FIG. 3. In some examples, the cryptographic operation requested by the cryptographic operation request 250 includes an encryption operation. Here, the cryptographic operation request 250 requests the HSM 200 to process the encryption operation on plain text using the wrapped cryptographic key 120 and the authorization token 220. Thus, the cryptographic operation request 250 may include plain text that the user 10 wants to encrypt via the cryptographic key 120. When the cryptographic operation includes a decryption operation, the cryptographic operation request 250 may include ciphertext that the user 10 wants decrypted via the cryptographic key 120. On the other hand, when the cryptographic operation includes a signing operation, the cryptographic operation request 250 may include a digital signature by the user 10 via the cryptographic key 120. The user interface 112 executing on the user device 110 may allow the user device 110 to generate the authorization token 220 and send the cryptographic operation request 250 including the cryptographic key 120 and the authorization token 220 to the HSM 200. For instance, the user interface 112 may allow the user 10 to access a client library or command line tool to generate the authorization token 220, provide an API to allow the user 10 to manually generate the authorization token 220, and/or use a call API to send the cryptographic operation request 250 to the HSM 200. At time 3, the HSM manager 150 may receive and send the cryptographic operation request 250 including the cryptographic key 120 and the authorization token 220 to the HSM 200.

At time 4, the HSM 200 authenticates and authorizes the cryptographic operation request 250 received from the user device 110. Here, the HSM 200 may determine whether the ACL 214 associated with the cryptographic key 120 (e.g., encryption key) of the cryptographic operation request 250 is authorized to govern access to the wrapped cryptographic key 120. By authorizing the association of the ACL 214 to the wrapped cryptographic key 120, the HSM 200 prevents unauthorized ACLs from trying to confuse the HSM 200, and thereby gain unauthorized access to the HSM 200. The ACL 214 associated with the cryptographic key 120 of the request 250 may be provided by the authorization token 220 (e.g., the authorization token 220 functions as the ACL 214). In some examples, the HSM 200 further determines whether the cryptographic operation (e.g., encryption operation) requested by the cryptographic operation request 250 is allowed by the ACL 214. The HSM 200 further validates the authorization token 220 of the cryptographic operation request 250. Generally, the HSM 200 validates the at least one authorization token 220 included in the request 250 by ensuring that each authorization token 220 satisfies the ACL 214 for the corresponding cryptographic operation requested by the cryptographic operation request 250. In other words, the user 10 must provide the proper authorization tokens 220 specified by the ACL 214 for the corresponding cryptographic operation. For example, the authorization token 220 may be valid when the authorization token 220 is signed by the authorizer key 118, i.e., the authorization token 220 includes the digital signature 230 (FIG. 2) signed by the authorizer key 118. The authorization token 220 may also be valid when the HSM 200 receives the authorization token 220 within the authorization time period 226 (FIG. 2) defined by the authorization token 220. For instance, the HSM 200 may reference the internal clock 211 to determine the time of when the authorization token 220 of the cryptographic operation request 250 was received. Additionally or alternatively, the authorization token 220 may be valid when the HSM 200 receives the authorization token less times than the limit number 228 (FIG. 2) defined by the authorization token 220. For instance, the HSM 200 may reference the counter 213 to determine how many times authorization token 220 has been received by the HSM 200. When the value of the counter 213 is less than the limit number 228, the HSM 200 may increment the counter 213. As the HSM 200 may execute many different cryptographic operations, the HSM 200 may implement a corresponding counter 213 associated with each of the different cryptographic operations capable of being executed by the HSM 200 at a given time.

At time 5, when the authorization token 220 is valid and the association of the ACL 214 to the wrapped cryptographic key 120 included in cryptographic operation request 250 is authorized, the HSM 200 processes the cryptographic operation request 250. The authorization token 220 of the cryptographic operation request 250 may include the ACL 214. Since the HSM 200 determines that both of these conditions are satisfied, the HSM 200 may proceed to unwrap the cryptographic key 120 to perform the operation requested by the cryptographic operation request 250. For example, when the cryptographic operation requested by the cryptographic operation request 250 includes the encryption operation, the HSM 200 executes the encryption operation on plain text using the cryptographic key 120. Here, the request 250 additionally includes the plain text for encryption. At time 6, the HSM 200 sends a response including the result 260 of the cryptographic operation. For instance, the result 260 of an encryption operation may include ciphertext computed by the HSM 200 on plain text provided in the cryptographic operation request 250. In scenarios when the cryptographic operations corresponds to a signing operation, the signing operation may include a digital signature to verify an origin of an electronic document and/or provide a status of the electronic document. The HSM manager 150 may receive and send the wrapped key 120 and signed statement to the user device 110 at time 7.

In some configurations, the user device 110 may generate the authorization token 220 and request the HSM manager 150 to store the authorization token 220 on the distributed system 140 (e.g., within storage resources 146). Here, the authorization token 220 may be long lived. In some examples, the distributed system 140 includes a repository that stores authorization tokens. The user device 110 may then send a cryptographic operation request 250 including only the cryptographic operation (e.g., encryption operation) and the cryptographic key 120 to the HSM manager 150, and the HSM manager 150 may retrieve the authorization token 220 for inclusion in the cryptographic operation request 250 to the HSM 200.

FIG. 5 provides a diagram 500 illustrating example operations performed by the HSM 200 to process a cryptographic operation request 250 from a delegated authorizer 234 delegated by the owner 10 of the cryptographic key 120. The diagram 500 may be described with reference to the cryptographic system 100 of FIGS. 1 and 2. The vertical y-axis indicates time increasing from the top to the bottom. At time 1, the user device 110 associated with the owner 10 generates a first authorization token ($T_1$) 220a for use in performing a corresponding cryptographic operation at the HSM 200. In the example shown, the first authorization token 220a defines one or more delegated authorizers 234 delegated by the owner 10 to validate the first authorization token 220a before the cryptographic operation request 250 is sent to the HSM 200.

At time 2, the user device 110 sends a delegation request 450 including the first authorization token 220a to each delegated authorizer 234 requesting each delegated authorizer 234 to validate and sign the first authorization token 220a before sending the cryptographic operation request 250 to the HSM 200. In some examples, the first authorization token 220a is long-lived and stored on the distributed system 140 (i.e., within the storage resources 146). The delegation request 450 can be sent to multiple delegated authorizers 234 defined by the first authorization token 220a. By validating and signing the first authorization token 220a, the delegated authorizer 234 may perform additional validation methods and translate an internal authorization structure associated with the delegated authorizer 234 (e.g., cloud service) into an authorization structure understandable by the HSM 200. Accordingly, at time 3, the delegated authorizer 234 generates a second authorization token ($T_2$) 220b including a corresponding digital signature signed by an authorization key 118 of the delegated authorizer 234. The HSM manager 150 may be associated with a public interface for a cluster of HSMs 200 on the distributed system 140.

At time 4, the delegated authorizer 234 sends the cryptographic operation request 250 including the cryptographic key 120, the first authorization token $T_1$ 220a and the second authorization token $T_2$ 220b to the HSM 200. In the example shown, the first and second authorization tokens 220a, 220b are bound to one another within the cryptographic operation request 250. The cryptographic key 120 of the delegated authorizer 234 is wrapped to include public parts of the authorizer key 118 of the delegated authorizer 234 for signing both of the authorization tokens 220a, 220b. In other examples, the delegated authorizer 234 embeds the first authorization token 220a into the second authorization token 220b and bundles the embedded authorization tokens 220 along with the cryptographic key 120 into the cryptographic operation request 250.

In some examples, the cryptographic operation requested by the cryptographic operation request 250 includes an encryption operation. Here, the cryptographic operation request 250 requests the HSM 200 to process the encryption operation on plain text using the private cryptographic key 120, the first authorization token $T_1$ 220a and the second authorization token $T_2$ 220b. Thus, the cryptographic operation request 250 may include plain text requiring encryption via the cryptographic key 120. When the cryptographic operation includes a decryption operation, the cryptographic operation request 250 may include ciphertext requiring decryption via the cryptographic key 120. In other examples, the cryptographic operation may include a signing operation requiring signing via the contents of the cryptographic key 120.

At time 5, the HSM 200 authenticates and authorizes the cryptographic operation request 250 received from the delegated authorizer 234. In some examples, the HSM 200 may further determine whether the cryptographic operation (e.g., encryption operation) requested by the cryptographic operation request 250 is allowed by the ACL 214 associated with the cryptographic key 120. At least one of the authorization tokens 220 may provide the ACL 214 so that an access policy to the HSM 200 can be refined without having to rely on a master ACL stored in the HSM 200. The ACL 214 may specify which, and how many, authorization tokens 220, 220a—b are needed in order to process the cryptographic operation request 250. The HSM 200 further validates the authorization tokens 220a, 220b of the cryptographic operation request 250. For example, the authorization token 220 may be valid when both the authorization tokens 220a, 220b are signed by the authorizer keys 118 of the user 10 and the delegated authorizer 234, i.e., the authorization tokens 220a, 220b include the digital signature 230 (FIG. 2) signed by the authorizer keys 118. In some examples, the first authorization token 220a is long-lived and the second authorization token 220b is valid when the HSM 200 receives the second authorization token 220b within an authorization time period 226 (FIG. 2) defined by the second authorization token 220b. For instance, the HSM 200 may reference the internal clock 211 to determine the time of when the second authorization token 220b of the cryptographic operation request 250 was received. Additionally or alternatively, the authorization token 220 may be valid when the HSM 200 receives the authorization tokens 220a, 220b less times than a limit number 228 (FIG. 2) defined by the authorization tokens 220a, 220b. For instance, the HSM 200 may reference the counter 213 to determine how many times the authorization tokens 220a, 220b have been received by the HSM 200. When the value of the counter 213 is less than the limit number 228, the HSM 200 may increment the counter 213. One or both of the authorization tokens 220a, 220b may define a corresponding limit number 228. When both the authorization tokens 220a, 220b define limit numbers 228, the limit number 228 corresponding to one of the tokens 220a, 220b may be the same or different than the limit number 228 corresponding to the other one of the tokens 220a, 220b.

At time 6, when the authorization tokens 220a, 220b are valid and the cryptographic key 120 of the cryptographic operation request 250 is authenticated, the HSM 200 process the cryptographic operation request 250. For example, when the cryptographic operation requested by the cryptographic operation request 250 includes the encryption operation, the HSM 200 executes the encryption operation on plain text using the cryptographic key 120. Here, the request 250 additionally includes the plain text for encryption. At time 7, the sends a response including the result 260 of the cryptographic operation to the delegated authorizer(s) 234. For instance, the result 260 of an encryption operation may include ciphertext computed by the HSM 200 on plain text provided in the cryptographic operation request 250.

FIG. 6 provides a diagram 600 illustrating example operations performed by the HSM 200 to log an entry 662 in an audit log 660 for each cryptographic operation processed by the HSM 200. The diagram 600 may be described with reference to the cryptographic system 100 of FIGS. 1 and 2 and the diagram 500 of FIG. 5. The vertical y-axis indicates time increasing from the top to the bottom. At time 1, the user device 110 associated with an owner of a cryptographic key 120 generates an authorization token 220, and at time 2, sends a delegation request 450 including the authorization token 220 to at least one delegated authorizer 234 defined by the authorization token 220. In some examples, the authorization token 220 further defines a limit number 228 limiting the number of usages of the corresponding authorization token 220. For instance, the authorization token 220 may be valid for only two cryptographic operations processed by the HSM 200. The delegated authorizer 234 may validate and sign the authorization token 220 using a private cryptographic key 120 of the delegated authorizer 234. The delegated authorizer 234 may also generate a second authorization token 220 digitally signed by the delegated authorizer 234 (i.e., using a corresponding authorizer key 118 associated with the delegated authorizer 234), and thereafter, bind the first authorization token generated by the owner/customer 10 to the second authorization token 220 generated by the delegated authorizer 234, or embed the two authorization tokens 220 together as discussed above with respect to the diagram 500 of FIG. 5.

At time 3, the delegated authorizer 234 sends a first cryptographic operation request 250, 250a including the authorization token 220 to the HSM 200. For clarity, the cryptographic key 120 and any additional authorization tokens 220 that the delegated authorizer 234 may have generated are not shown. At time 4, the HSM 200 processes the first cryptographic operation request 250a after authenticating and authorizing the first cryptographic operation request 250a received from the delegated authorizer 234. In the example shown, the HSM 200 determines that the cryptographic key 120 and associated ACL 214 of the request 250a is authentic and validates the authorization token 220. The authorization token 220 may be valid when the HSM 200 receives the authorization token less times than the limit number 228 (FIG. 2) defined by the authorization token 220. For instance, when the limit number 228 is equal to two ("2"), the HSM 200 may reference the counter 213 to determine how many times authorization token 220 has been received by the HSM 200. When the value of the counter 213 is less than the limit number 228 (e.g., 2), the HSM 200 may increment the counter 213 and process the cryptographic operation request 250. In the example shown, the HSM increments the counter 213 to have a value equal to one "1" after processing the first cryptographic operation request 250a. The ACL 214 associated with the cryptographic key 120 may specify the authorization token 220 that needs to be validated in order to process the cryptographic operation request 250.

In some implementations, the HSM 200 creates a corresponding audit log entry 662 in the audit log 660 for each cryptographic operation request 250 processed by the HSM 200. The HSM 200 may sign each audit log entry 662 using the authorizer key 118 of the delegated authorizer 234 included within the corresponding wrapped cryptographic key 120. Each audit log entry 662 may also include each authorization token 220 the HSM 200 validates to process the cryptographic operation request 250. At time 5, the HSM 200 sends a response back to the delegated authorizer 234 that includes the result 260 of the first cryptographic operation request 250a processed by the HSM 200. For an encryption operation, the result 260 may include ciphertext. Additionally, the HSM 200 provides the audit log 660 including a first audit log entry 662, 662a for the first cryptographic operation request 250a processed by the HSM 200 to the HSM manager 150. In some examples, the HSM 200 simply provides the first audit log entry 662a to the HSM manager 150 and the HSM manager 150 records the entry 662a in the audit log 660 stored within the storage resources 146 of the distributed system 140.

At time 6, the delegated authorizer 234 sends a second cryptographic operation request 250, 250b including the authorization token 220 to the HSM 200, and at time 7, the HSM 200 authenticates and authorizes the second cryptographic operation request 250 received from the delegated authorizer 234, as discussed above at time 4. Here, the HSM 200 validates the authorization token 220 of the second cryptographic operation request 250b by referencing the counter 213 and determining that the value (e.g., 1) of the counter 213 is less than the value (e.g., 2) of the limit number 228 defined by the authorization token 220. Thereafter, the HSM 200 increments the counter 213 to the value of two ("2") so that any subsequent cryptographic operation requests 250 using the authorization token 220 will be denied since the authorization key 220 will be deemed invalid.

At time 8, the HSM 200 sends a response back to the delegated authorizer 234 that includes the result 260 of the second cryptographic operation request 250b processed by the HSM 200. For an encryption operation, the result 260 may include ciphertext. Additionally, the HSM 200 provides the audit log 660 including a second audit log entry 662, 662b for the second cryptographic operation request 250b processed by the HSM 200 to the HSM manager 150. In some examples, the HSM 200 simply provides the second audit log entry 662b to the HSM manager 150 and the HSM manager 150 records the entry 662b in the audit log 660 stored within the storage resources 146 of the distributed system 140.

At time 9, the client device 110 associated with the owner 10 receives the audit log 660 including the first and second audit log entries 662a, 662b. At time 10, the owner 10 may validate the audit log 660 to account for all authorized cryptographic operations. In some examples, the owner 10 may validate the audit log 660 when the number of audit log entries 662 matches the number (i.e., limit number 228) of cryptographic operations authorized by the owner 10. For instance, the owner 10 may be able to quickly determine that the authorization token 220 has been misused when the number of log entries 662 exceeds the limit number 228 defined by the authorization token 220. At any time, the client device 110 may request the HSM manager 150 to send the audit log 660.

Figure 7:
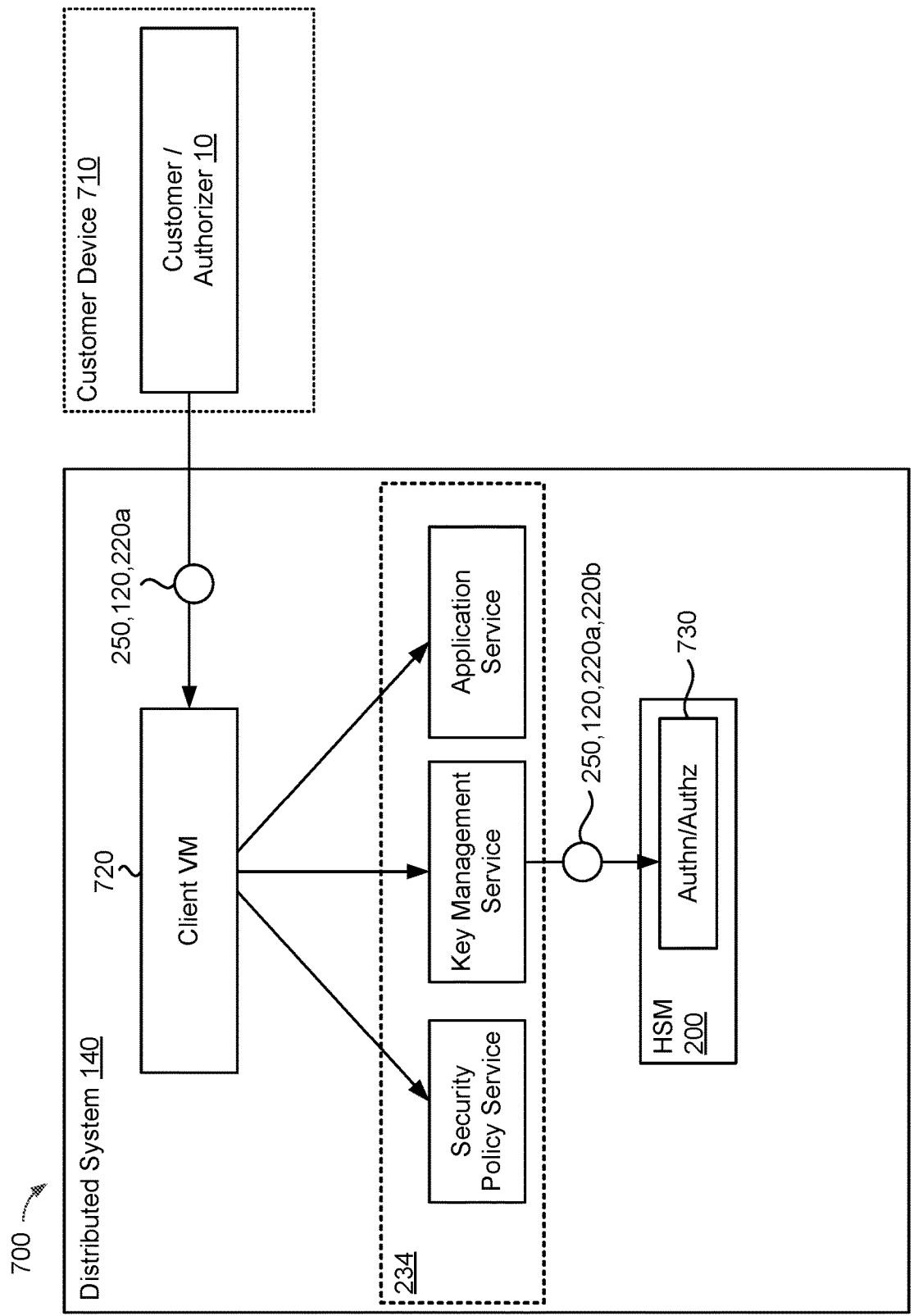
FIG. 7 is a block diagram of an example implementation of components of an example authorization system for authorizing cryptographic operation requests.

FIG. 7 is a block diagram of an example implementation of components of an example authorization system 700 for authorizing cryptographic operation requests 250 including at least one authorization token 220 sent from a customer/authorizer 10 to a HSM 200 of the distributed system 140. A customer device 710 associated with the customer/authorizer 10 may communicate with the distributed system 140 via the network 130 of FIG. 1. The distributed system 140 includes a customer virtual machine (VM) 720, one or more delegated authorizers 234, and the HSM 200. Each delegated authorizer 234 may be an independent entity delegated by the customer/authorizer 10 to make authorization decisions associated with cryptographic operation requests 250.

In the example shown, the delegated authorizers 234 include a security policy service, a key management service, and an application service executing on the distributed system. The security policy service provides a security policy set by the customer/authorizer 10 for managing permissions to resources owned by the customer/authorizer 10. The key management service may allow the customer/ authorizer 10 to manage cryptographic operations for services executing on the distributed system. For instance, the key management service may be integrated with the security policy service to manage permissions on specific cryptographic keys 120 that may be owned by the customer/authorizer 10 and kept private from the distributed system 140. The application service may correspond to a document service, email service, calendar service, or other service executing on the distributed system.

The customer/authorizer 10 may send a cryptographic operation request 250 requesting the HSM 200 to process a corresponding cryptographic operation 250 (e.g., encryption operation). In the example shown, the client VM 720 of the distributed system 140 receives the cryptographic operation request 250 including a cryptographic key 120 owned by the customer/authorizer 10 and a first authorization token 220*a*. The first authorization token 220*a* may define capability restrictions such as the authorization time period 226 for when the token 220*a* is valid and/or the limit number 228 limiting the number of usages of the corresponding token 220*a*. The first authorization token 220*a* may further define one or more delegated authorizers 234 delegated by the authorizer/customer 10 to further validate the token 220 before sending the request 250 to the HSM 200. In the example shown, the first authorization token 220*a* may define each of the security policy service, the key management service, and the application service as delegated authorizers 234.

In some implementations, one or more of the delegated authorizers 234 may generate a corresponding authorization token 220*b* bound to the first authorization token 220*a* if the certain conditions are met. For instance, the security policy service may generate a corresponding authorization token 220 if the authorizer/owner 10 is authorized to access cryptographic key 120 based on the permissions set forth in the security policy. The application service may generate a corresponding authorization token 220*b* if the customer/owner 10 uses the cryptographic key 120 to encrypt/decrypt all data associated with the application service. For instance, the application service may sign the authorization token 220*a* of the cryptographic operation request received from the customer/owner 10 using a private key associated with the application service. Thereafter, the key management service may send the capability request 250 including the first authorization token 220*a* signed by the authorizer key 118 bundled in the wrapped cryptographic key 120 associated with the owner/customer and the second authorization token 220*b* signed by an authorizer key associated with the application service. The second authorization token 220*b* may define an authorization time period 226 that is different than the authorization time period 226 defined by the first authorization token. The HSM 200 may process the cryptographic operation request 250 when each of the authorization tokens 220*a*, 220*b* are valid and the HSM 200 authorizes the association of the ACL 214 with cryptographic key 120 of the cryptographic operation request 250. The HSM 200 may include an authentication/authorization module 730 including the internal clock 211, counter(s) 213, and ACL 214 of FIG. 1.

By allowing the customer/authorizer 10 to define the delegated authorizers 234 associated with the distributed system 140 in the authorization token 220, the delegated authorizers 234 may perform additional validation methods and translate an internal authorization structure associated with the delegated authorizers 234 into an authorization structure understandable by the HSM 200. Accordingly, the customer/authorizer 10 does not have to call out a corresponding public key for each delegated authorizer 234 executing on the distributed system 140. Additionally, the customer/authorizer does not have to have an account established with the HSM 200 or establish a direct control channel to the HSM 200.

Figure 8:
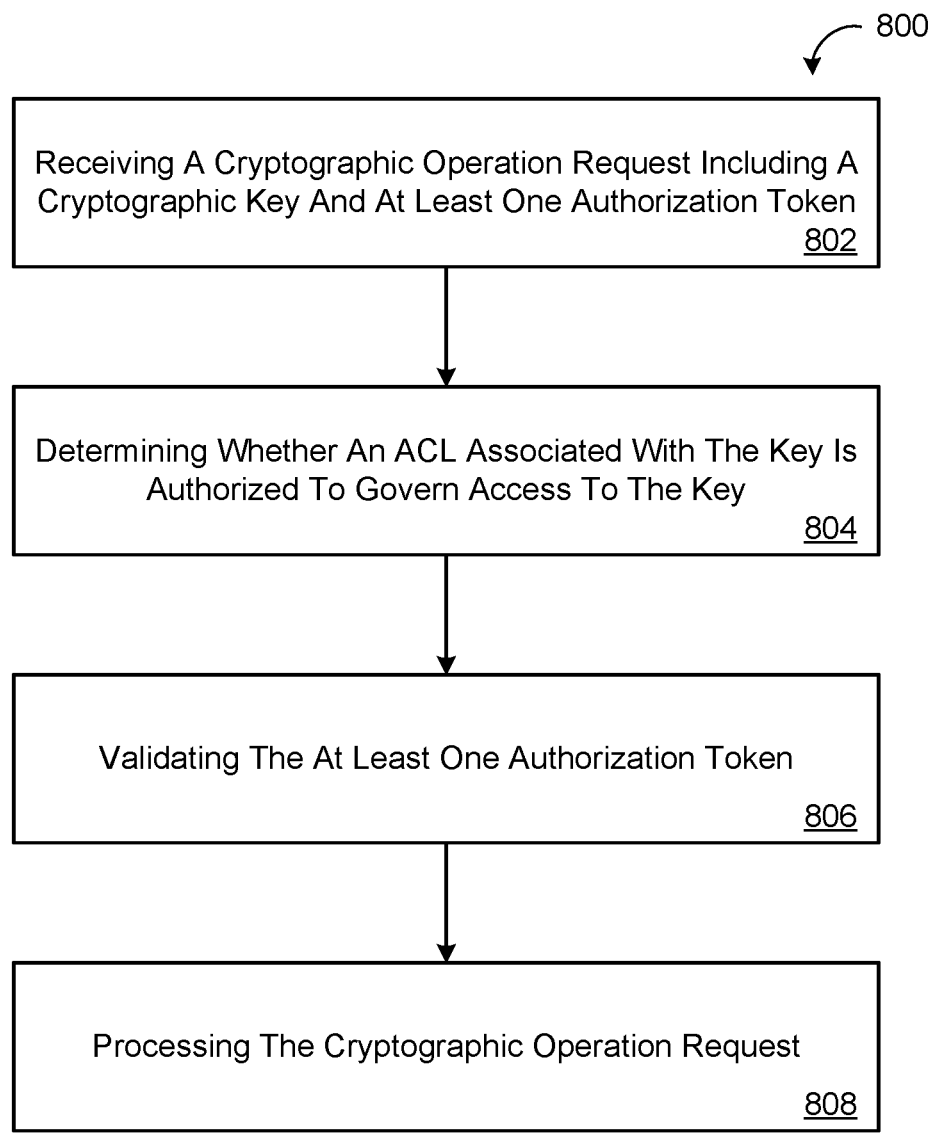
FIG. 8 is a flow chart of an example method for processing a cryptographic operation request.

FIG. 8 illustrates a method 800 for processing a cryptographic operation request 250. At block 802, the method 800 includes receiving, at a hardware security module (HSM) 200, the cryptographic operation request 250 including a cryptographic key 120 and at least one authorization token 220. For instance, the HSM 200 may receive the request 250 from a user device 110 associated with an owner 10 of the cryptographic key 120. Alternatively, the HSM 200 may receive the request 250 from a delegated authorizer 234 delegated by the owner 10 of the cryptographic key 120 to use the at least one authorization token 220. The cryptographic key 120 may be wrapped. At block 804, the method 800 includes determining, by the HSM 200, whether an access control list (ACL) 214 associated with the cryptographic key 120 of the cryptographic operation request 250 is authorized to govern access to the cryptographic key 120.

At block 806, the method 800 includes validating, by the HSM 200, the at least one authorization token 220. For instance, the authorization token 220 may be valid when at least one of the token 220*a* is signed by the authorizer key 118 of the owner 10, the HSM 200 has received the token 220 within an authorization time period 226 defined by the token 220, or the HSM has received the token 220 less times than a limit number 228 defined by the token 220.

At block 808, when the at least one authorization token 220 is valid and the cryptographic key 120 of the cryptographic operation request 250 is authentic, the method includes processing, by the HSM 200, the cryptographic operation request 250. In some examples, the HSM 200 only processes the request 250 when the cryptographic operation requested by the cryptographic operation request 250 is allowed by the ACL 214. After processing the request 250, the HSM 200 may send a response that includes a result 260 of the cryptographic operation back to the user device 110 associated with the owner of the cryptographic key 120. Here, the result 260 may include ciphertext when the cryptographic operation is an encryption operation.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 (e.g., data processing hardware) can process instructions for execution within the computing device 900, including instructions stored in the memory 920 (e.g., memory hardware) or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 (e.g., memory hardware) stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware of a hardware security module (HSM) causes the data processing hardware to perform operations, the operations comprising:
   receiving, from a key-generating user, a cryptographic key creation request requesting the HSM to generate a wrapped cryptographic key;
   in response to the cryptographic key creation request from the key-generating user, generating the wrapped cryptographic key;
   receiving, from a secondary user authorized by the key-generating user to use the wrapped cryptographic key generated by the HSM to perform one or more cryptographic operations, a cryptographic operation request requesting to perform a cryptographic operation, the cryptographic operation request comprising the wrapped cryptographic key and an access attribute indicating the secondary user is authorized to request performance of the cryptographic operation;
   generating a log record of the cryptographic operation, the log record indicating that the secondary user requested performance of the cryptographic operation;
   signing the log record using a key that identifies the secondary user;
   and communicating the signed log record of the cryptographic operation to the key-generating user.

2. The method of claim 1, wherein the operations further comprise:
   receiving the cryptographic operation request from the secondary user, the cryptographic operation request further comprising at least one authorization token;
   determining whether the at least one authorization token is valid; and
   when the at least one authorization token is valid executing the cryptographic operation request from the secondary user.

3. The method of claim 2, wherein the access attribute indicating that the secondary user is authorized to request execution of the cryptographic operation is associated with the at least one authorization token.

4. The method of claim 2, wherein the at least one authorization token comprises a temporary authorization token portion and a persistent authorization token portion.

5. The method of claim 4, wherein the persistent authorization token portion is generated for the key-generating user and shared with the secondary user.

6. The method of claim 2, wherein the log record further comprises the at least one authorization token of the cryptographic operation request.

7. The method of claim 1, wherein wrapped cryptographic key comprises the key that identifies the secondary user.

8. The method of claim 1, wherein:
   the cryptographic operation corresponds to an encryption operation using the wrapped cryptographic key; and
   the cryptographic operation further comprises plain text to encrypt with the wrapped cryptographic key.

9. The method of claim 1, wherein the key-generating user restricts a number of times that the secondary user is authorized to perform the one or more cryptographic operations using the wrapped cryptographic key.

10. A hardware security module (HSM) comprising:
    data processing hardware; and
    memory hardware in communication with the data processing hardware, the memory hardware storing instructions that when executed on the data processing hardware cause the data processing hardware to perform operations comprising:
    receiving, from a key-generating user, a cryptographic key creation request requesting the HSM to generate a wrapped cryptographic key;
    in response to the cryptographic key creation request from the key-generating user, generating the wrapped cryptographic key;
    receiving, from a secondary user authorized by the key-generating user to use the wrapped cryptographic key generated by the HSM to perform one or more cryptographic operations, a cryptographic operation request requesting to perform a cryptographic operation, the cryptographic operation request comprising the wrapped cryptographic key and an access attribute indicating the secondary user is authorized to request performance of the cryptographic operation;
    generating a log record of the cryptographic operation, the log record indicating that the secondary user requested performance of the cryptographic operation;
    signing the log record using a key that identifies the secondary user;
    and communicating the signed log record of the cryptographic operation to the key-generating user.

11. The HSM of claim 10, wherein the operations further comprise:
    receiving the cryptographic operation request from the secondary user, the cryptographic operation request further comprising at least one authorization token;

determining whether the at least one authorization token is valid; and when the at least one authorization token is valid executing the cryptographic operation request from the secondary user.

12. The HSM of claim 11, wherein the access attribute indicating that the secondary user is authorized to request execution of the cryptographic operation is associated with the at least one authorization token.

13. The HSM of claim 11, wherein the at least one authorization token comprises a temporary authorization token portion and a persistent authorization token portion.

14. The HSM of claim 13, wherein the persistent authorization token portion is generated for the key-generating user and shared with the secondary user.

15. The HSM of claim 11, wherein the log record further comprises the at least one authorization token of the cryptographic operation request.

16. The HSM of claim 10, wherein wrapped cryptographic key comprises the key that identifies the secondary user.

17. The HSM of claim 10, wherein:
the cryptographic operation corresponds to an encryption operation using the wrapped cryptographic key; and
the cryptographic operation further comprises plain text to encrypt with the wrapped cryptographic key.

18. The HSM of claim 10, wherein the key-generating user restricts a number of times that the secondary user is authorized to perform the one or more cryptographic operations using the wrapped cryptographic key.

* * * * *